J. H. MATTHEWS.
BREAK OF GAUGE MECHANISM.
APPLICATION FILED OCT. 20, 1920.

1,408,219.

Patented Feb. 28, 1922.
3 SHEETS—SHEET 1.

INVENTOR.
JOHN HENRY MATTHEWS
PER
Attorney.

J. H. MATTHEWS.
BREAK OF GAUGE MECHANISM.
APPLICATION FILED OCT. 20, 1920.

1,408,219.

Patented Feb. 28, 1922.
3 SHEETS—SHEET 2.

INVENTOR
JOHN HENRY MATTHEWS
PER
ATTORNEY.

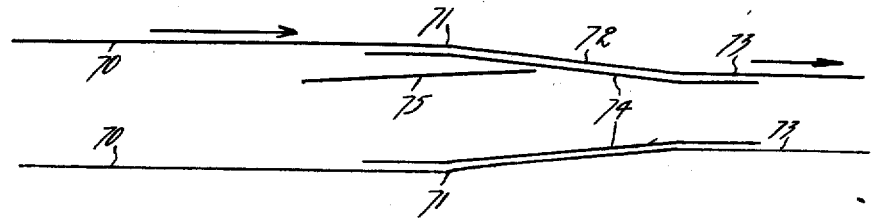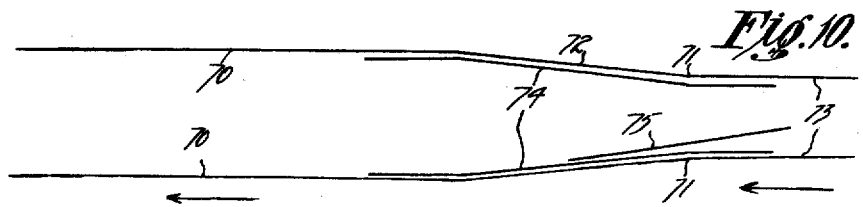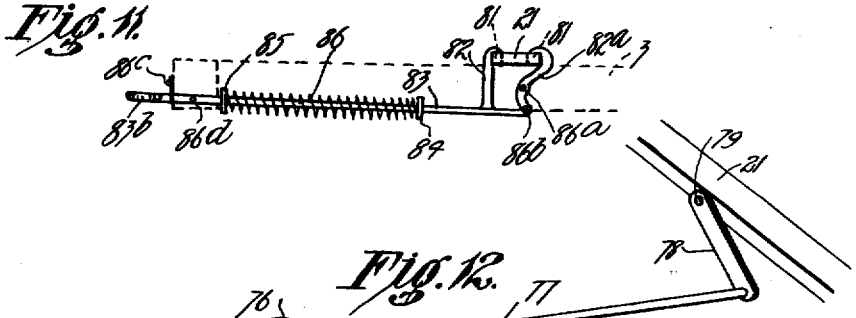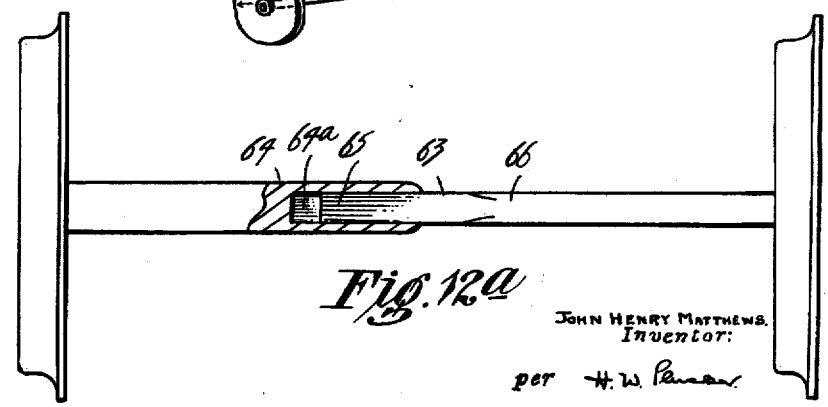

UNITED STATES PATENT OFFICE.

JOHN HENRY MATTHEWS, OF NORTHCOTE, NEAR MELBOURNE, VICTORIA, AUSTRALIA.

BREAK-OF-GAUGE MECHANISM.

1,408,219.  Specification of Letters Patent.  Patented Feb. 28, 1922.

Application filed October 20, 1920. Serial No. 418,213.

*To all whom it may concern:*

Be it known that I, JOHN HENRY MATTHEWS, a citizen of the Commonwealth of Australia, and resident of 210 Clarke Street, Northcote, near Melbourne, in the State of Victoria, Commonwealth of Australia, have invented a certain new and useful Break-of-Gauge Mechanism, of which the following is a specification.

This invention relates to improved break of gauge mechanism and has been specially devised in order to provide mechanism which is not only cheap and effective but which is of greater utility than the known devices.

The object of the invention consists in so arranging the mechanism that the parts are not weakened and when applied to rolling stock under-frames will readily and automatically change from one gauge to another.

This invention has been devised in order to overcome existing defects in this class of mechanism and to provide cheap, simple and automatic interchanging mechanism to allow, when all the rolling stock of a train is fitted with the mechanism embodied in the invention, for the change of gauge without a stop, it being obvious that where separate engines are employed for one gauge only, the train of carriages can be backed or pushed from one gauge to another to be coupled to an engine on the other gauge.

The essential characteristics embodied in the invention are as follows:

1. Mechanism attached to the underframe of rolling stock adapted to automatically release sliding bars carrying the wheel supports to allow the wheels and their supports to move inwardly or outwardly as the case may be when interchanging from one gauge to another.

2. The use of trip mechanism adapted to automatically release the locking mechanism when changing gauge and when contact is made by the trip mechanism on a guide rail.

3. Means for automatically locking the sliding bars supporting the wheels in the narrow or wide gauge position after the trip mechanism is released from its guiding rail at the break of gauge terminus.

4. The means whereby the trip mechanism and consequently the wheels is operated when traveling forwardly or rearwardly in changing gauge.

5. The means of mounting the wheel centre to the wheel and for detaching and renewing the hub or centre when worn.

6. The automatic lubricating means for the wheels.

In order that the invention may be more readily understood it will now be described with reference to the accompanying drawings in which:

Figure 7 is a view in vertical central section of the improved wheel construction, while

Figures 9 and 10 illustrate in diagrammatic plan view the rail points at the change of gauge terminus.

Figures 11 and 12 are views illustrating essential details, and

Figure 1:
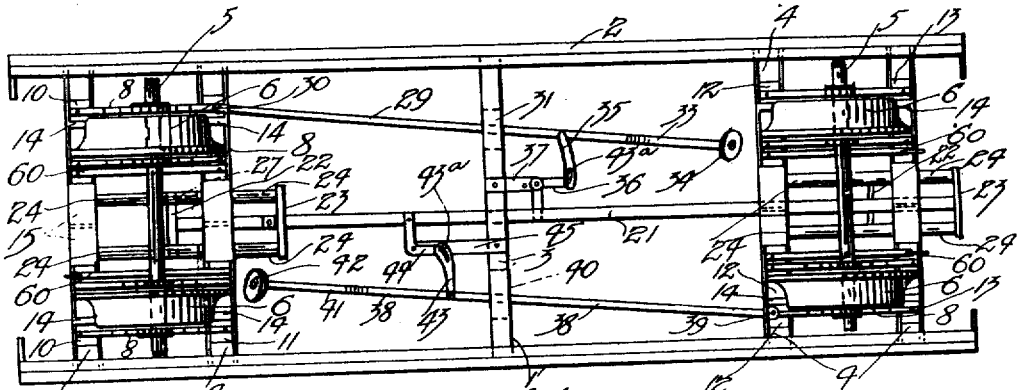
Figure 1 is a view in underside plan.
Figure 2:
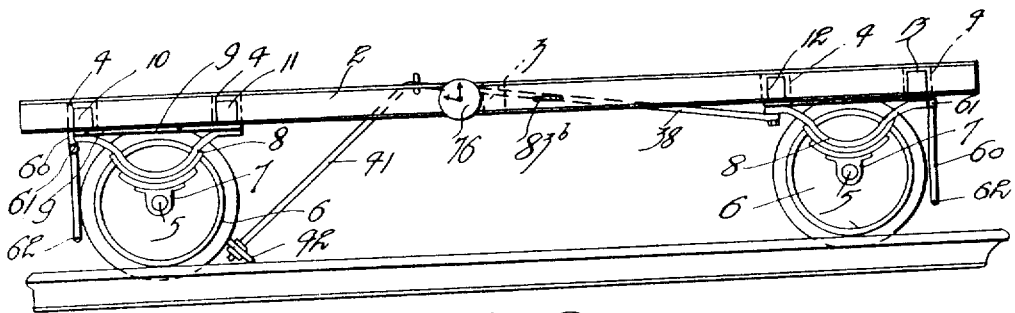
Figure 2 is a view in side elevation.
Figure 3:
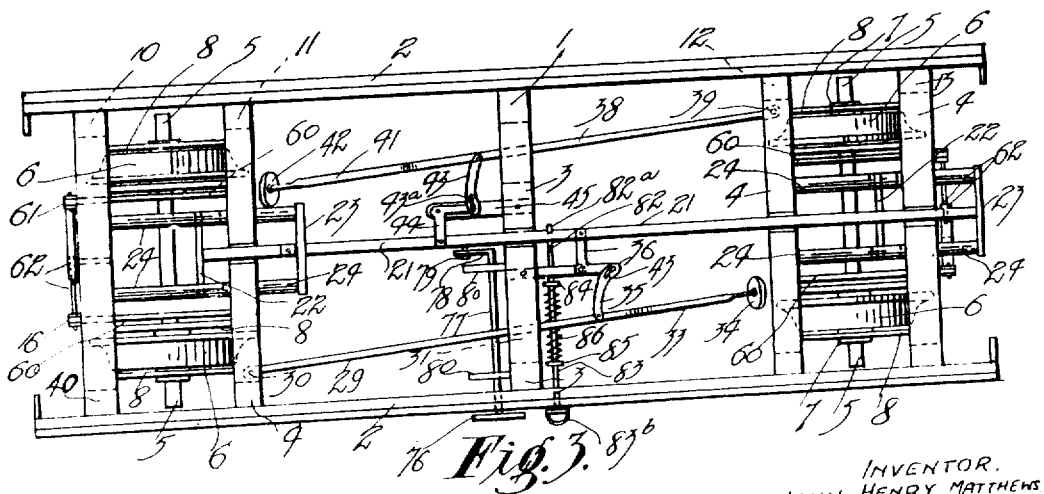
Figure 3 is a view in plan of the improved break of gauge mechanism fitted to the under frame of rolling stock.
Figures 4, 5:
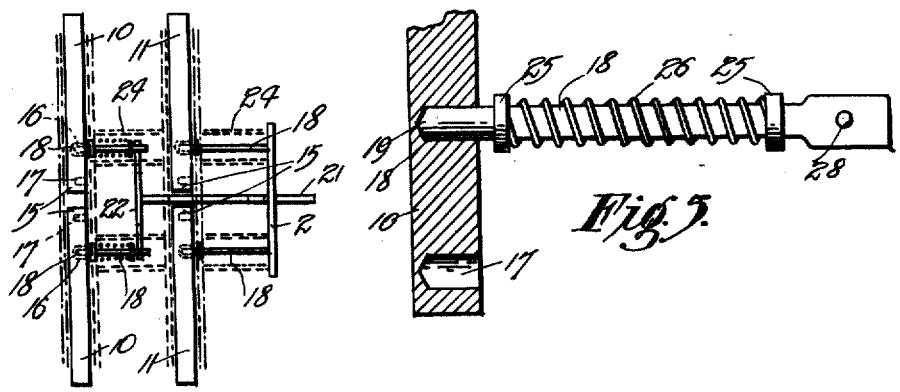
Figure 4 is a view in plan of the means employed for locking the sliding bars carrying the wheel supports.
Figure 5 is an enlarged view of an essential feature of said locking means.
Figure 6:
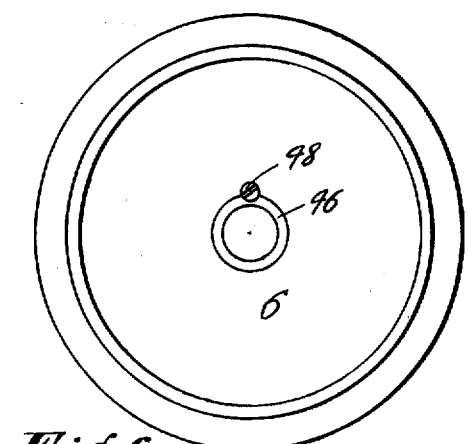
Figure 6 is a view in side elevation.
Figure 7:
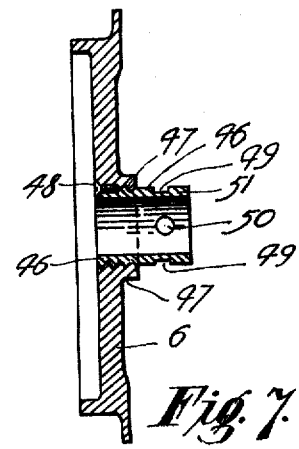
Figure 8:
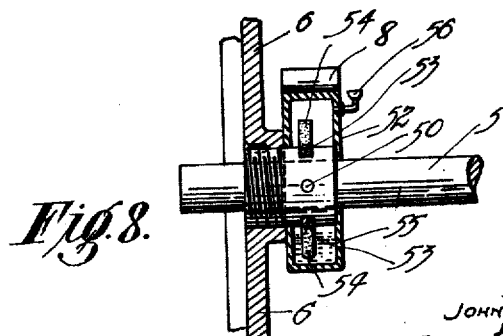
Figure 8 is a sectional view illustrating the wheel lubricating means.

Figure 12ᵃ is a view of the construction of the wheel axle when solid wheels are employed.

According to this invention the underframe 1 consists of longitudinal main beams 2, the central support 3 and two spaced end beams 4 disposed at each end of the frame. The usual tie rods, buffers and other usual devices are not illustrated but will be used in the ordinary manner.

Fixed axles 5 are provided and rotatably and loosely mounted thereon are the flanged wheels 6 which are underslung and are supported by the box 7 connecting the springs 8 the expansion and contraction of which is allowed for by being connected to the bars 9 which connect the transversely sliding bars 10, 11, 12, 13. Preferably two spaced sliding bars are provided for each wheel being encased in the cross beams 4 with a limited movement, the sliding bars of the front and rear wheels being adapted to slide inwardly towards each other or outwardly away from each other according to the direction of movement of the wheels 6.

Limit stops 14 are provided to limit the inward and outward movement of the sliding bars 10, 11, 12 and 13 and consequently the lateral movement of the wheels 6.

When the wheels 6 are set to the narrow gauge the inner ends 15 of the sliding bars are substantially close together but when set to the wide gauge the inner ends of the bars are distanced from each other.

The inner ends of each of the bars are formed with two spaced holes 16, 17 and these holes are adapted to receive a pin or bolt 18 the end of the pin being shaped as at 19 and the inner end of the hole is correspondingly shaped. When the pin or bolt 18 is in position in one of the holes and as illustrated the sliding bars and consequently the wheels 6 are firmly held in position, the pin 18 is in the hole 16 being in line of travel for narrow gauge but when in the hole 17 it is in the line of travel for the broad gauge.

Means are embodied for automatically tripping the mechanism to release the pins or bolts 18 from the sliding bars 10, 11, 12 and 13 during the change of gauge operation which release allows the bars to slide and consequently the wheels either inwardly or outwardly to narrow or broad gauge and after the gauge is changed the sliding bars and consequently the wheels are automatically held in the line of travel.

These means preferably comprise a central longitudinal bar 21 to each end of which is fitted the cross pieces 22, 23 which connect the locking bolts or pins 18 which are encased as at 24.

The front or both sets of locking pins 18 for the front and rear wheels 6 are formed or fitted with collars 25 between which and surrounding the pin 18 is a helical spring 26 which facilitates the return or locking movement of the pins 18.

The cross pieces 22 enter slots 27 in the front pin casings 24 and pass through a hole 28 in the said forwardly positioned pins 18.

This locking and unlocking control mechanism is preferably automatically operated in which case a bar 29 would be pivoted at the point 30 to one of the sliding bars such as 11 and would extend rearwardly through a guiding slot 31 in the centre cross beam 3 being bent downwardly as at 33 and being fitted at its lower end with a roller 34.

A link 35 connects a bell crank 36 pivoted to a bracket 37 carried by the cross beam 3, the opposite end of the bell crank being connected to the central bar 21 as illustrated.

Oppositely to the bar 29 is a similar bar 38 pivotally connected at 39 to the sliding bar 12 and passing through the hole 40 in the beam 3 is bent downwardly at 41 and is fitted with a roller 42. A link 43 connects the arm 38 with a bell crank 44 mounted to a bracket 45 carried by the beam 3 and this bell crank 44 also connects the central bar 21 as illustrated, the bell crank 44 being disposed in the manner illustrated to allow of the automatic control of the locking mechanism should the car be travelling from left to right while the bar 21 is automatically operated if the car is travelling from right to left according to the position shown in the drawings. The links 35 and 43 at the point of connection with the bell cranks 36 and 44 are slotted as at 43ª so that when one of the arms 29 or 38 is operated the bell crank of the other arm moves in the slot 43ª without moving its arm.

The wheels 6 are preferably specially constructed being flanged in the ordinary way but the wheel centre preferably consists of a detachable bush 46 threaded at 47 to the wheel and locked thereto by the screw 48 entering a thread partly formed in the wheel 6 and partly in the bush 46. The bush 46 is extended as at 51 and is formed with a circumferential groove 49 with two oppositely disposed holes 50 adapted to allow lubricant to pass between the bush 46 and the axle 5. The bush extension 51 is encased by a box 52 receiving lubricant 55, the box 52 being supported by the springs 8. In the groove 49 is a cord or chain 53 fitted with pads 54 which on the rotation of the bush 46 automatically lubricate the parts while a filling tube 56 may be provided to quickly replenish the supply of lubricant.

In the modification illustrated in Figure 12ª where a solid wheel is employed the axle 5 is divided as at 63 the female end 64 being enlarged and formed with a squared hole 64ª which receives the squared end 65 of the male portion 66.

In order to automatically indicate at sight whether the locking pins 18 have been released or returned into locking position in the sliding bars 10, 11, 12 and 13 a dial or disc 76 indicating two positions is mounted to the side of the undercarriage being fitted to a rod 77 cranked or bent as at 78 and pivoted at 79 to the central arm 21. This rod 77 is supported in slotted brackets 80 mounted to the central beam 3.

So as to ensure that the bar 21 is rigidly held when the pins 18 are in locking position, the bar 21 is recessed as at 81 Fig. 11 to receive the arms 82, 82ª which connect a rod 83 fitted with a collar 84. This collar 84 is rigidly fitted to the rod 83 and to this rod is also fitted a loose collar 85. Between these collars is disposed a helical compression spring 86 the end of the rod 83 passing through the side beams and terminates in a handle 83ᵇ.

The arm 82 rigidly connects the rod 83 while the arm or pawl 82ª is pivoted to the central beam 3 at 86ª and to the rod 83 at 86ᵇ.

Preparatory to the operation of changing gauge the handle 83ᵇ is pulled out allowing the hook 86ᶜ to engage the hole 86ᵈ and in this movement against the compression of the spring 86 the arms 82 and 82ᵃ are released from engagement with the central bar 21 and the parts are free for changing gauge. After the changing of gauge the hook 86ᶜ is released from the hole 86ᵈ and the spring 86 automatically returns the arms 82, 82ᵃ into locking position on the central bar 21.

The brake mechanism is fitted to the bars 60 depending downwardly at the front and rear and connected to the laterally sliding devices 10, 11, 12 and 13 above described. These bars are hinged as at 61 and at their lower ends at each end of the carriage connect a cross rod 62 centrally divided, the divided portions telescoping one within the other to allow of movement in changing gauge.

In the drawings the parts are in gear for narrow gauge running, the locking pins 18 being in engagement with the holes 16 of the sliding bars 10, 11, 12 and 13 but when at the break of gauge terminus and according to the direction the respective roller 34 or 42 engages a guide or traversing rail 75 which acting on the roller forces the same outwardly so causing the respective bell crank 36 or 44 as the case may be, to operate the central bar 21 which in turn moves the cross pieces 22 and 23 which move the pins 18 out of the holes 16 and 17 so releasing the sliding bars 10, 11, 12 and 13 and allowing the wheels to move outwardly away from each other with a gradual movement to the wider or broad gauge.

From the broad gauge to narrow gauge the operation is identical and when the gauge is changed and the rollers 29 or 42 released from their guide rails, the springs 26 when the pins 18 are opposite the respective holes 16 or 17 cause the said pins to enter into locking position in the sliding bars 10, 11, 12 and 13.

As illustrated in Figure 9 the rail points are shown as laid for the change from the broad to narrow gauge the broad gauge rails 70 terminating at the point 71 and a gradual narrowing line 72 is provided leading to the narrow gauge line 73 guiding rails 74 being provided for the wheel flanges during the change of gauge.

The traversing rail 75 is positioned extending outwardly towards the rails 72 and 74 and past the point 71 so that as the respective roller 34 or 42 engages the outer edge of the traversing rail the arm 29 or 38 is forced outwardly and the locking pins 18 released from the sliding bars 10, 11, 12 and 13, thus allowing the wheels 6 to move inwardly towards each other and the pins 18 will remain out of engagement until the wheels are on the narrow gauge when the pins 18 being opposite the holes 16 in the bars 10, 11, 12 and 13 automatically slide into locking position in the bars.

In Figure 10 of the drawings, the rails are laid for changing from narrow to broad gauge, the operation being identical. The traversing rail 75 is positioned to extend past the terminal point 71 of the narrow gauge, and the gradual broadening rails 72 are provided as well as the guiding rails 74.

The train leaving the narrow gauge 73 after the locking pins 18 have been released by the roller 34 or 42 having engaged with the traversing rail 75 runs on the widening rails 72 to the broad gauge rails 70 and when the wheels run on to the broad gauge rails the holes 17 of the sliding bars 10, 11, 12 and 13 are opposite the locking pins 18 and the said sliding bars are automatically refastened by the pins 18 entering the holes 17.

I desire it to be understood that various modifications and improvements may be embodied for carrying the above described functions into practical effect without departing from the spirit and scope of the invention.

Break of gauge mechanism constructed, arranged, and operating as above described will be of great utility particularly for the reason of the rigid construction and arrangement and the automatic operation of the parts.

What I claim as my invention and desire to secure by Letters Patent is—

1. Break of gauge mechanism having sliding bars, means fitted to the undercarriage or frame of rolling stock and adapted to automatically release said sliding bars, means on the said bars carrying the wheel supports whereby the wheels and their supports are allowed to move inwardly or outwardly when interchanging from one gauge to another.

2. Break of gauge mechanism having sliding bars carrying the wheels, locking members for said bars, a traversing rail and trip mechanism adapted to automatically release the locking members when changing gauge and when contact is made by the trip mechanism with the traversing rail.

3. Break of gauge mechanism having sliding bars, means for automatically releasing and locking said sliding bars in the undercarriage, wheel supports on the said bars, and means consisting of trip mechanism normally locking the sliding bars in position but allowing of the release of the sliding bars during the changing of gauge.

4. Break of gauge mechanism having sliding bars in the undercarriage, wheel supports on the said bars, trip mechanisms so disposed that the sliding bars are released when changing gauge in either direction of travel, traversing rails, rollers provided on the trip mechanism and adapted to engage the traversing rails during the operation of changing gauge, and means for automatically locking the sliding bars after the gauge has been changed.

5. Break of gauge mechanism consisting of sliding bars mounted in the undercarriage of the rolling stock, means on the said bars for supporting the wheels, and means for automatically locking and releasing the slidable bars as and for the purpose specified.

6. Break of gauge mechanism wherein the wheels are supported upon and by bars in guides and adapted to slide laterally with a limited movement over break of gauge line points, spaced holes in said bars adapted to receive locking pins or bolts, springs surrounding said bolts and means for automatically releasing and locking the bolts in the respective holes in the sliding bars for the purposes specified.

7. Break of gauge mechanism having cross members in the undercarriage of the rolling stock, wheels adapted to slide laterally with bars slidably arranged in the said cross members, bolts adapted to lock into or be released from spaced holes in the sliding bars, transverse members connected therewith, a centrally disposed longitudinal arm carrying the said members, oppositely disposed arms each pivoted to one of the bars and being provided with a roller adapted to engage a guide rail on the track, bell cranks connecting the roller arms with the central arm, and springs surrounding the locking pins or bolts as and for the purposes specified.

8. Break of gauge mechanism according to claim 7 having springs adapted to return the parts of the trip mechanism and return the locking bolts or pins to locking position in the slidable bars working in the undercarriage and carrying the wheel supports, the said springs being fitted to and around the locking pins substantially as described.

9. Break of gauge mechanism having the wheels slidably arranged on fixed axles, guide beams in the under frame, bars slidably arranged in the guide beams, wheels and supports slidably carried on said bars, and means for locking and releasing the sliding bars as required and for the purposes specified.

10. Break of gauge mechanism characterized in that the wheels are slidably arranged, the wheel supports being carried by bars, guides for said bars, spaced holes in the bars, means such as locking pins or bolts connecting an arm adapted to be operated on by the engagement of a roller on a traversing rail and means for locking the arm and consequently the locking pins in position in the sliding bars substantially as described.

11. Break of gauge mechanism wherein laterally sliding wheels are supported by sliding members adapted to be locked in position by pins entering holes in said bars, a bar controlling the said pins and means consisting of a pivoted jaw or arm and a fixed jaw or arm on a rod and entering recesses in the said controlling bar, a spring surrounding said rod, a handle for operating the rod and means for holding the rod and consequently the gripping jaws clear of the controlling bar substantially as described.

12. Break of gauge mechanism consisting in the combination with an undercarriage of laterally sliding bars in guides supporting the wheels, means for locking the bars in two positions, means for releasing the locking devices when contact is made with a traversing rail, means for holding the locking devices in locked position, means for releasing the locking devices and means for indicating whether the locking devices are in or out of engagement with the sliding bars supporting the wheels substantially as described.

Signed at Melbourne, Victoria, Australia, this 17th day of September 1920.

JOHN HENRY MATTHEWS.

In the presence of—
 SIDNEY HENDLEY,
 A. EAWORD.